A. B. BURT.
PNEUMATIC SPRING.
APPLICATION FILED MAR. 20, 1916.
1,202,157.
Patented Oct. 24, 1916.
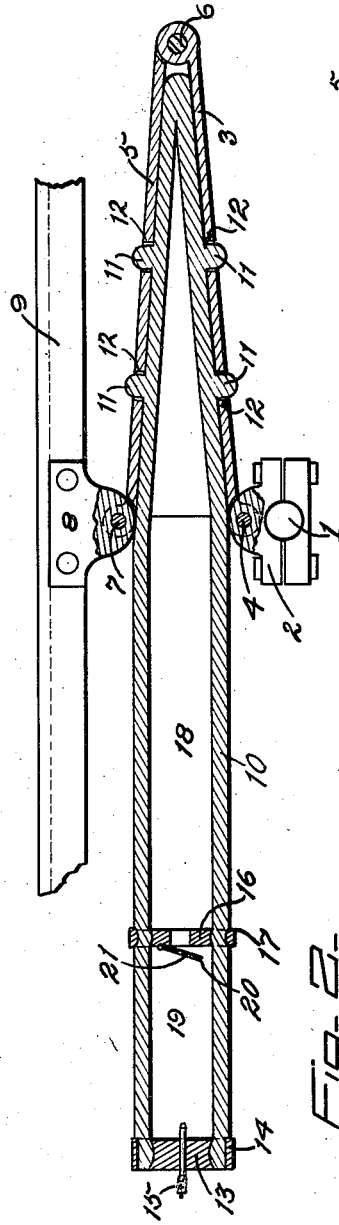
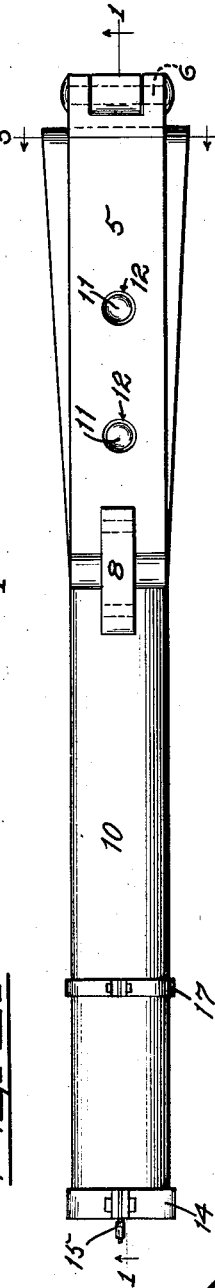
WITNESS
INVENTOR
BY
ATTORNEYS.

UNITED STATES PATENT OFFICE.

ANDREW B. BURT, OF SAN FRANCISCO, CALIFORNIA.

PNEUMATIC SPRING.

1,202,157.

Specification of Letters Patent.

Patented Oct. 24, 1916.

Application filed March 20, 1916. Serial No. 85,360.

*To all whom it may concern:*

Be it known that I, ANDREW B. BURT, a citizen of the United States, residing in the city and county of San Francisco and State of California, have invented certain new and useful Improvements in Pneumatic Springs, of which the following is a specification.

The present invention relates to fluid means for absorbing the relative vertical motion between the axles and body of a vehicle, and more particularly to a pneumatic spring.

The object of the invention is to provide a device of the class described whose resilience is so controlled that the motion transmitted thereby from the axle to the body of the vehicle is only that which is least objectionable.

It is well known that the upward movement, or rebound, of a vehicle body is far more objectionable than the downward movement, and various means are known to the art to check the rebound without interfering with the downward movement. These devices are in the nature of auxiliary appliances, designed to be used in conjunction with, and in addition to the usual vehicle springs.

By the employment of my pneumatic spring, however, the necessity for such auxiliary devices is avoided, since the usual function thereof, namely the desirable control of the spring action, is combined in the one device with the regular functions of the vehicle spring. Moreover, the nature of my pneumatic spring enables it to perform these functions so perfectly, that it is particularly adaptable to motor vehicles, and when used upon such vehicles, eliminates the necessity for pneumatic tires. That is, my device is capable of performing the functions of the pneumatic tires, in absorbing the smaller road shocks, as well as the functions of the springs and the usual dampers or so-called shock-absorbers.

A further object of the invention is to provide a simple and inexpensive device for the described purpose, which may be quickly and easily replaced in the event of failure or accident, and which thus possesses an additional advantage over the usual steel spring.

Although my invention is particularly useful as a vehicle spring, and is so described and illustrated hereinafter, it is to be understood that it may be put to other uses, and may be readily adapted for any purpose where results of the described type are desirable. Moreover, although the preferred form of my device makes use of air as the elastic medium, nevertheless other fluids may be used with equally successful results.

In order to fully comprehend the invention, reference should be had to the accompanying drawings, wherein—

Figure 1 is a sectional elevation of my pneumatic spring. Fig. 2 is a plan view thereof. Fig. 3 is an end elevation. Fig. 4 is a detailed view showing a preferred manner of mounting the spring upon the vehicle frame. Fig. 5 is a transverse section taken in the direction of the arrows on the line 5—5 of Fig. 2.

In the drawings, the reference numeral 1 designates the axle of a vehicle, upon which is mounted a suitably constructed bracket or seat 2. A plate 3 is pivotally connected with the seat 2, as shown at 4, and a similar plate 5 is pivotally connected at 6 to the upper or outer end of said plate 3. The free end of the upper plate 5 is pivotally connected at 7 to an upper seat or bracket 8, which supports and carries the frame or body of the vehicle, a portion thereof being illustrated at 9.

The numeral 10 designates an inclosed flexible chamber, formed of suitable material, as, for example, rubber, or a combination of rubber and woven fabric, and preferably of tubular form. A portion of this tubular chamber or cushion 10, preferably one end portion, lies within the substantially triangular space between the hinged plates 3 and 5, and means are provided for retaining said cushion 10 in position, illustrated as comprising projections 11 extending outwardly from the surface thereof and adapted to seat within apertures 12 in said plates 3 and 5. The other end of the tubular cushion 10 is closed by means of a plug 13, about which the wall of the tube is clamped by a band 14. An admission check valve 15 is provided in said end plug 13, said valve being illustrated in the drawings as similar to the well known pneumatic-tire valve. A ported diaphragm 16, about which the wall of the tube is clamped as by means of a band 17, divides said tube into two chambers, a working chamber 18 and a storage chamber 19. A check valve 20, of any suitable form, is associated with the port of said diaphragm 16, to provide free passage through said port from the working chamber 18 to the storage chamber 19, but to obstruct the flow in the opposite direction. A relief port 21 is formed in said check valve 20, to permit the fluid within the storage chamber 19 to escape slowly into the working chamber 18, when the pressures in said chambers are in the proper relation.

In the operation of the device, air or other fluid, preferably of an elastic nature, is forced into the cushion through the valve 15, and, flowing through the relief port 21 in the check valve 20, fills both chambers 18 and 19 to an equal pressure, said pressure being sufficient to support the weight of the body of the vehicle, and to separate the plates 3 and 5 the desired distance. When the device is in this condition, a suddenly applied force tending to either move the axle up or the body down, will bring the plates 3 and 5 closer together, and compress the portion of the cushion 10 lying therebetween. This raises the pressure of the fluid within the working chamber 18 and forces a portion thereof from within said chamber 18 into the storage chamber 19, which transfer is quickly accomplished through the check valve 20.

When the disturbing force ceases to be exerted, the fluid pressure within the working chamber 18 will expand the end of the cushion between the plates to its original form, thereby lifting the body 9 of the vehicle to its original and normal position. This expansion is retarded by the slow transfer of fluid from the storage chamber 19 to the working chamber 18, through the relief port 21, the check valve 20 being closed by the relatively greater pressure in said chamber 19. Thus it will be seen that the downward movement of the vehicle body is controlled and opposed by the entire pneumatic cushion, but its upward movement, or rebound, is caused initially by the expansion of only a part of the entire cushion, namely that forming the working chamber 18, and is then continued at considerable length by the relatively slow release of the fluid within the storage chamber 19. Thus the desired action is attained; that is, the vehicle body is permitted a relatively free and unchecked downward movement, but its rebound is rendered slow and unobjectionable.

The relative speed and power of the compression and expansion strokes of the device may be regulated as desired, both by altering the areas of either the relief port 21 or the aperture of the diaphragm 16 closed by the check valve 20, and by changing the position of said diaphragm longitudinally within the tube 10.

The tubular formation of the cushion has the effect of rendering the device very sensitive to small movements or shocks, for the reason that when said cushion is inflated to its normal condition, the area of its contact with the plates 3 and 5 is less than when said cushion is under greater compression, and therefore its sensitiveness is greater when in said normal condition. Hence as the compression increases the resistance of the cushion also increases, and vice versa.

The plates 3 and 5 have a dual function. They serve as compression plates for that portion of the pneumatic cushion which lies between them, and in addition, by being pivotally inter-connected at 6, they act to provide the necessary rigid connection, in a longitudinal direction, between the body 9 and the axle 1. Should the cushion fail to operate, by reason of the rupture of its walls or an accident to one of the valves, it can be removed and a new cushion quickly and easily inserted in its place by raising the body of the vehicle until the projecting lugs 11 are freed from the retaining apertures 12 in the plates 3 and 5. Extra cushions may be carried in an inflated condition, or they may be inflated after insertion by an ordinary pneumatic tire pump.

I do not wish to limit myself to the particular form of the device herein illustrated and described, for the reason that many changes may be made therein without involving the essential principles of the invention. I therefore wish to be construed as claiming the invention as broadly as the art will permit.

Having thus described my invention, what I claim as new and desire to protect by Letters Patent is:—

1. A pneumatic spring comprising a flexible tubular member adapted to contain fluid under pressure, a diaphragm extending transversely of the tubular member and dividing the interior thereof into two chambers, and a check valve in said diaphragm for controlling the passage of fluid therethrough.

2. A pneumatic spring comprising a hollow tubular member having flexible side walls and adapted to contain fluid under pressure, a diaphragm extending transversely of the tubular member and dividing the interior thereof into two chambers, and a check valve in said diaphragm for controlling the passage of fluid therethrough in one direction.

3. A pneumatic spring comprising a hollow flexible member adapted to contain fluid under pressure, a diaphragm dividing the interior thereof into two chambers, a check valve in said diaphragm for controlling the passage of fluid therethrough, a pair of rigid members adapted to lie on opposite sides of said flexible member, and means for retaining said flexible member and said rigid members in their proper relative positions.

4. A pneumatic spring comprising a hollow flexible member adapted to contain fluid under pressure, a diaphragm dividing the interior thereof into two chambers, a check valve in said diaphragm for controlling the passage of fluid therethrough, a pair of pivotally connected rigid members adapted to lie on opposite sides of said flexible member, and means for retaining said flexible member and said rigid members in their proper relative positions.

5. A pneumatic spring comprising a hollow flexible member adapted to contain fluid under pressure, a diaphragm extending transversely of and dividing the interior thereof into two chambers, a check valve in said diaphragm for controlling the passage of fluid therethrough, and means for exerting exterior pressure upon opposite sides of one member of said flexible member.

6. A pneumatic spring comprising a hollow flexible member having its interior divided into two fluid containing chambers, means for controlling the passage of fluid from one to the other of said chambers, and a pair of rigid members adapted to lie on opposite sides of said flexible member and to exert pressure thereon.

7. A pneumatic spring comprising a hollow flexible member having its interior divided into two fluid containing chambers, a check valve for controlling the passage of fluid from one to the other of said chambers, and a pair of rigid members adapted to lie on opposite sides of said flexible member and to exert pressure thereon.

8. A pneumatic spring comprising a hollow flexible member having its interior divided into two fluid containing chambers, means for controlling the passage of fluid from one to the other of said chambers, and a pair of spaced rigid members adapted to lie on opposite sides of one of said chambers and to exert pressure thereon.

9. A pneumatic spring comprising a hollow flexible member having its interior divided into two fluid containing chambers, a check valve for controlling the passage of fluid from one to the other of said chambers, and means for exerting exterior pressure upon opposite sides of one of said chambers.

10. A pneumatic spring comprising a flexible tubular member adapted to contain fluid under pressure, a pair of pivotally connected rigid members adapted to lie on opposite sides of one end portion of said flexible member and to exert pressure thereon, and means for retaining said flexible member in operative relation with said rigid members, comprising projections carried by said flexible member for engagement with apertures formed in said rigid members.

11. A pneumatic spring comprising a hollow flexible member having its interior divided into two fluid containing chambers, means for controlling the passage of fluid from one to the other of said chambers, and means for exerting exterior pressure upon opposite sides of one of said chambers.

12. A pneumatic spring comprising a flexible tubular member adapted to contain fluid under pressure, a diaphragm within said flexible member dividing the interior thereof into two chambers, means for controlling the passage of fluid from one to the other of said chambers, and means for exerting exterior pressure upon opposite sides of one of said chambers.

13. A pneumatic spring comprising a flexible tubular member adapted to contain fluid under pressure, a diaphragm within said flexible member dividing the interior thereof into a working chamber and a storage chamber, a check valve in said diaphragm for permitting free passage of fluid from said working chamber into said storage chamber, and for obstructing the passage of fluid in the reverse direction, and means for exerting exterior pressure upon opposite sides of said working chamber.

14. A pneumatic spring comprising a flexible tubular member adapted to contain fluid under pressure, a diaphragm within said flexible member dividing the interior thereof into a working chamber and a storage chamber, a check valve in said diaphragm for permitting free passage of fluid from said working chamber into said storage chamber, said valve having a relief port for permitting relatively slow passage of fluid in the reverse direction, and means for exerting exterior pressure upon opposite sides of one end portion of said working chamber.

15. A pneumatic spring comprising a flexible tubular member adapted to contain fluid under pressure, a diaphragm within said flexible member dividing the interior thereof into a working chamber and a storage chamber, a check valve in said diaphragm for permitting free passage of fluid from said working chamber into said storage chamber, said valve having a relief port for permitting relatively slow passage of fluid in the reverse direction, and a pair of pivotally connected rigid members adapted to lie on opposite sides of said working chamber and to exert exterior pressure thereon.

16. A pneumatic spring, comprising two spaced rigid members pivotally inter-connected at one end, a flexible tubular member interposed therebetween, a ported transverse diaphragm within said flexible member, a check valve for closing the port of said diaphragm against passage of fluid in one direction, said check valve having a relief port formed therein for permitting relatively slow passage of fluid in the reverse direction, a valve in the wall of said tubular member for admitting fluid thereinto, and means for retaining said flexible member in operative position between said rigid members.

In testimony whereof I have signed my name to this specification in the presence of a subscribing witness.

ANDREW B. BURT.

Witness:
HARRY G. TOTTEN.